(12) United States Patent
Dong et al.

(10) Patent No.: US 12,591,746 B2
(45) Date of Patent: Mar. 31, 2026

(54) LANGUAGE MODEL TUNING IN CONVERSATIONAL ARTIFICIAL INTELLIGENCE SYSTEMS AND APPLICATIONS

(71) Applicant: NVIDIA Corporation, Santa Clara, CA (US)

(72) Inventors: Yi Dong, Lexington, MA (US); Xianchao Wu, Tokyo (JP); Yi Fen Zenodia Charpy, Alingsås (SE)

(73) Assignee: NVIDIA Corporation, Santa Clara, CA (US)

( * ) Notice: Subject to any disclaimer, the term of this patent is extended or adjusted under 35 U.S.C. 154(b) by 472 days.

(21) Appl. No.: 18/123,055

(22) Filed: Mar. 17, 2023

(65) Prior Publication Data

US 2024/0311579 A1     Sep. 19, 2024

(51) Int. Cl.
*G06F 40/00* (2020.01)
*G06F 40/40* (2020.01)

(52) U.S. Cl.
CPC .................................... *G06F 40/40* (2020.01)

(58) Field of Classification Search
CPC .......... G06N 3/08; G06N 3/02; G06N 3/0895; G06N 3/09; G06N 3/091; G06N 3/092; G06N 3/094; G06N 3/096; G06N 3/0985; G06N 3/098; G06N 5/04; G06N 5/046; G06N 5/045; G06N 5/043; G06N 5/042; G06N 5/041; G06N 5/048; G06N 20/20;

G06N 20/10; G06N 20/00; G06N 3/044; G06N 3/0442; G06N 3/045; G06N 3/0455; G06N 3/0464; G06N 3/047; G06N 3/0475; G06N 3/048; G06F 16/3344; G06F 40/284; G06F 40/279; G06F 40/274; G06F 40/20; G06F 40/237; G06F 40/242; G06F 40/247
See application file for complete search history.

(56) References Cited

U.S. PATENT DOCUMENTS

2023/0112921 A1* 4/2023 Cai ........................... G06F 8/31
                                            717/104
2024/0061835 A1* 2/2024 Subramanian ........ G06F 16/252

OTHER PUBLICATIONS

S. Khatri, M. Iqbal, G. Ubakanma and S. van der Vliet-Firth, "SkillBot: Towards Data Augmentation using Transformer language model and linguistic evaluation," 2022 Human-Centered Cognitive Systems (HCCS), Shanghai, China, 2022, pp. 1-9. (Year: 2022).*
(Continued)

*Primary Examiner* — Edgar X Guerra-Erazo
(74) *Attorney, Agent, or Firm* — Lowenstein Sandler LLP

(57) ABSTRACT

Disclosed are systems and techniques that may generate prompts for language models. The techniques include obtaining a first dataset and a second dataset and training a hierarchical virtual token generator (VTG) model to generate a large language model (LLM) input prompt. Training the hierarchical VTG includes training, based on the first dataset, a first VTG to output a first virtual token and training, based on the second dataset, a second VTG to output a second virtual token embedding. The generated LLM input prompt includes the first virtual token embedding and the second virtual token embedding.

20 Claims, 11 Drawing Sheets

(56) References Cited

OTHER PUBLICATIONS

Xiang Lisa Li and Percy Liang. 2021. Prefix-Tuning: Optimizing Continuous Prompts for Generation. In Proceedings of the 59th Annual Meeting of the ACL and the 11th International Joint Conference on Natural Language Processing (vol. 1: Long Papers), pp. 4582-459 (Year: 2021).*

Brown, Tom, et al. "Language models are few-shot learners." Advances in neural information processing systems 33 (2020): 1877-1901. (Year: 2020).*

Ng, Y., Miyashita, D., Hoshi, Y., Morioka, Y., Torii, O., Kodama, T., & Deguchi, J. (2023). Simplyretrieve: A private and lightweight retrieval-centric generative ai tool. arXiv preprint arXiv:2308.03983. (Year: 2023).*

Brown, et al., "Language Models are Few-Shot Learners," 34th Conference on Neural Information Processing Systems (NEURIPS 2020), Vancouver, Canada, 25 pages.

Jaegle, et al., "Perceiver: General Perception with Iterative Attention," Proceedings of the 38th International Conference on Machine Learning, PMLR 139, 2021, 14 pages.

Kuchaiev, et al., "NeMo: a toolkit for building AI applications using Neural Modules," arXiv:1909.09577v1 [cs.LG] Sep. 14, 2019, 8 pages.

Liu, et al., "GPT Understands, Too," arXiv:2013.10385v1 [cs.CL] Mar. 18, 2021, 10 pages.

Liu, et al., "Pre-train, Prompt, and Predict: A Systematic Survey of Prompting Methods in Natural Language Processing," ACM Comput. Surv. 55, 9, Article 195 (Jan. 2023), 35 pages. https://doi.org/10.1145/3560815.

Ouyang, et al., "Training language models to follow instructions with human feedback," arXiv:2203.02155v1 [cs.CL] Mar. 4, 2022, 68 pages.

Sanh, et al., "Multitask Prompted Training Enables Zero-Shot Task Generalization," arXiv:2110.08207v3 [cs.LG] Mar. 17, 2022, 216 pages.

Wei, et al., "Finetuned Language Models are Zero-Shot Learners," arXiv:2109.01652v5 [cs.CL] Feb. 8, 2022, 46 pages.

* cited by examiner

100

500

Obtain a 1$^{st}$ dataset and a 2$^{nd}$ dataset 510

Train a hierarchical VTG model to generate a LLM input prompt 520

Train a first VTG based on the 1$^{st}$ dataset 530

Train a second VTG based on the 2$^{nd}$ dataset 540

Receive an input identifying a NLP task 610

Generate a LLM input prompt using a trained hierarchical VTG 620

Perform the NLP task by providing the generated LLM input prompt to a LLM 630

LANGUAGE MODEL TUNING IN CONVERSATIONAL ARTIFICIAL INTELLIGENCE SYSTEMS AND APPLICATIONS

TECHNICAL FIELD

At least one embodiment pertains to processing resources and techniques that facilitate artificial intelligence. For example, at least one embodiment pertains to generating prompts for language models.

BACKGROUND

Artificial intelligence is consistently being used to automate new and more complex tasks that were previously performed by humans. Machine learning models can be trained to solve a variety of tasks. Specifically, large language models can be trained to solve a number of natural language processing tasks. A general large language model may need to be tuned in order to provide accurate results for particular natural language processing tasks.

DETAILED DESCRIPTION

Figure 1:
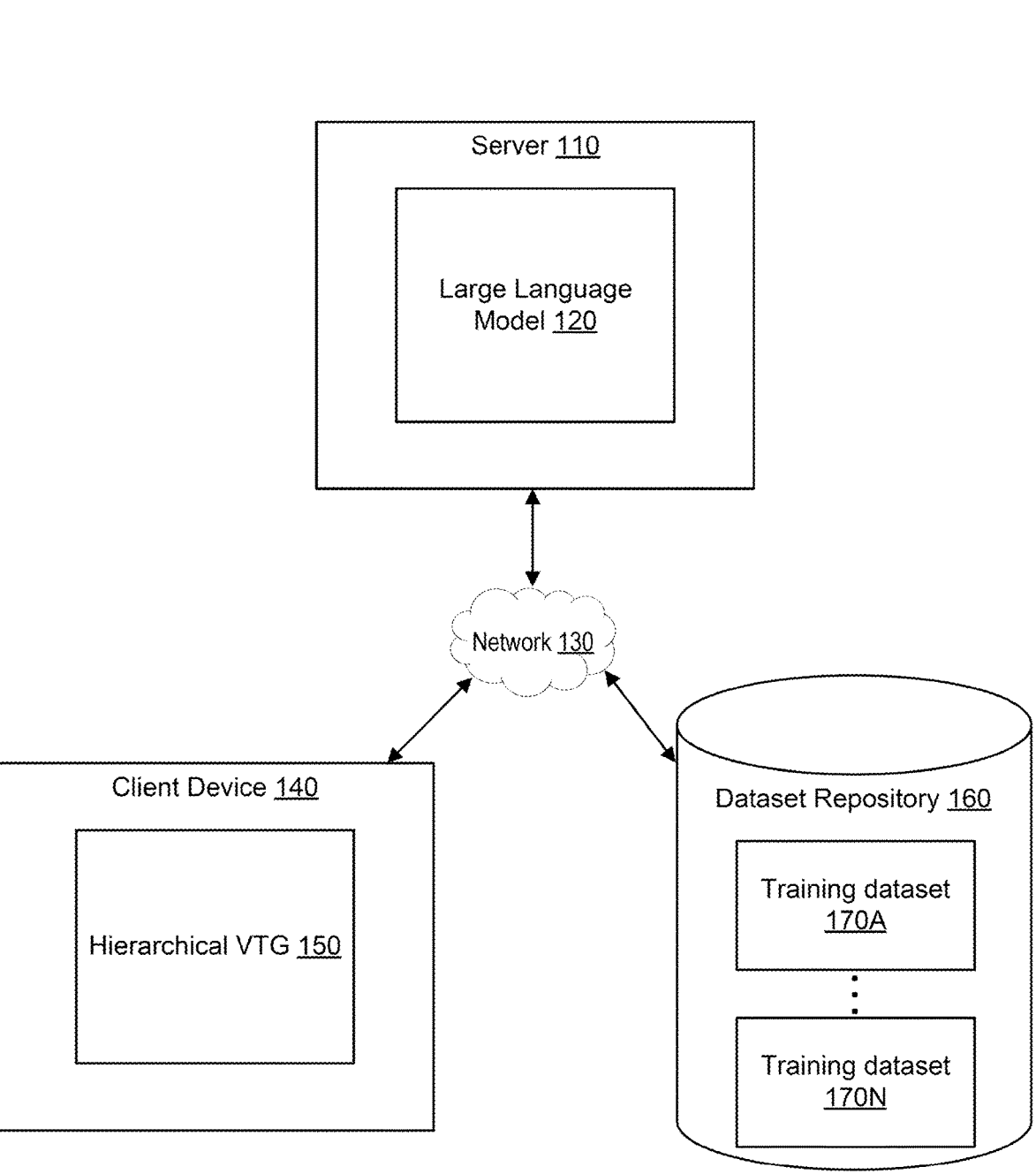
FIG. 1 is a block diagram of an example computer system that uses a hierarchical virtual token generator to generate language model prompts, according to at least one embodiment.

There are different ways that language models-such as large language models (LLM)—may be tuned in order to provide accurate results for particular natural language processing (NLP) tasks. In some cases, few-shot learning is used to tune the LLM at inference time by providing, as input to the LLM, one or more example input/output pairings along with a user's request. For example, an LLM input prompt used during few-shot learning may include a description of the task (e.g., "translate from English to French"), one or more examples of the task being performed (e.g., "sea otter=> loutre de ner"), and the prompt that the LLM is to complete (e.g., "cheese=>"). However, the accuracy of the output may not be satisfactory and finding a good input prompt that would facilitate an accurate output can require a lot of trial and error. In other cases, the LLM can be fine-tuned using a diversified set of datasets which include training inputs and corresponding target outputs. During fine-tuning, the weights of the LLM are modified to improve the accuracy of the model based on the training data within the datasets. Because the training data within the fine-tuning datasets is typically much smaller than the training data used to train the LLM, the fine-tuning process may eliminate the LLM's capability of generating diversified outputs because the model will be biased toward the limited number of examples in the fine-tuning datasets.

Aspects and embodiments of the present disclosure address these and other technological challenges by using a novel prompt training method instead of a fine-tuning method to produce better outputs of a LLM while maintaining the LLM's full memory capacity. In some embodiments, a hierarchy of virtual token generators (VTGs) are used to generate, based on user inputs, a fixed length virtual token embedding to prompt the LLM. A virtual token generator may receive text as an input and may output a set of virtual tokens (e.g., fixed length virtual token embedding), wherein individual virtual tokens may include a vector containing one or more values within an embedding space of the machine learning model. Individual levels of VTGs in the hierarchy may be trained one at a time based on a corresponding dataset of training data. Individual levels of VTGs may use a perceiver transformer architecture, which may include cross-attention modules and transformer-style self-attention blocks. In some embodiments, the hierarchy of VTGs may include three levels. A first-level VTG may be trained using a first dataset to generate a first set of virtual token embeddings that customize the LLM to perform a variety of NLP tasks. During training of the first-level VTG, weights of the second-level VTG and third-level VTG may be frozen. The second-level VTG and the third-level VTG may provide default virtual token embeddings to the LLM during training of the first-level VTG. During training of the first-level VTG, an input from the first dataset may be provided to the first-level VTG. The virtual token embedding generated by the first-level VTG, the default virtual token embeddings of the second-level VTG and the third-level VTG, and the input from the first dataset may be provided to the LLM. A loss calculation (e.g., cross-entropy loss) may be performed based on the LLM output compared to the target output of the first dataset. Weights of the first-level VTG may be updated based on the calculated loss. The first dataset may be large and may establish a good baseline VTG that performs well for a variety of NLP tasks and can generate virtual token embeddings that align with the user's intent. Because the LLM weights are kept intact (e.g., are not fine-tuned), the LLM does not lose its ability to generate diversified outputs.

A second-level VTG may be trained using a second dataset to improve upon the results of the first-level VTG. The second dataset may include target outputs labelled by users. For example, a user may provide a novel input (e.g., an input not contained in the first dataset) to the hierarchical VTG, which generates a set of virtual token embeddings that is provided to the LLM, which generates an output. If the output is incorrect, as determined by the user, the user may modify the output generated by the LLM. The novel input and the modified output may be added to the second dataset. The second dataset may be used to train the second-level VTG. During training of the second-level VTG, the weights of the other VTGs may be frozen, and an input from the second dataset may be provided to the first-level and second-level VTGs. Both the first-level VTG and the second-level VTG may generate a virtual token embedding. A default virtual token embedding may be used for the third-level VTG. The set of virtual token embeddings and the novel input may be provided to the LLM, which may produce an output. A model loss may be calculated by comparing the output of the LLM to the user-provided target output from the second dataset, and weights of the second-level VTG may be updated based on the calculated loss. By training the second-level VTG to reduce the errors of the first-level VTG, the hierarchical VTG model causes the LLM to generate a more accurate output based on the user-provided corrections. In some embodiments, a first group of users (e.g., users of an organization, users of an online community, users of a geographical region, etc.) may add modified outputs to the second dataset.

A third-level VTG may be trained on a third dataset to further improve upon the results achieved with the first-level VTG and the second-level VTG. The third dataset may include target outputs labelled by a second group of users. In some embodiments, the second group of users is a subset of the first group of users that added target outputs to the second dataset. In some embodiments, the second group of users is distinct from the first group of users. In some embodiments, the second group of users may only contain one user, which adds outputs to the third dataset. The third-level VTG may be trained in a similar manner as the second-level VTG.

In some embodiments, more (or less) than three levels of VTGs may be used in the hierarchical VTG model. Individual levels of VTGs may have a corresponding dataset that includes modified outputs of the previous level. Individual levels of VTGs may be retrained at different intervals. For example, a second-level VTG may be retrained based on new additions to the second dataset on a daily basis. A third-level VTG may be retrained immediately upon adding data to the third dataset.

The advantages of the disclosed techniques include but are not limited to allowing a user to obtain customized responses from a LLM without making a copy of the LLM and modifying the weights of the LLM. A user can run the hierarchical VTG model locally, which requires much fewer computing resources than running the LLM, and can provide the prompt generated by the hierarchical VTG model to a remote LLM, thus preserving the user's computing resources.

System Architecture

FIG. 1 is a block diagram of an example computer system 100 that uses a hierarchical virtual token generator to generate language model prompts, according to at least one embodiment. As depicted in FIG. 1, a computer system 100 may include a server 110, a client device 140, and a dataset repository 160 connected to a network(s) 130. Network(s) 130 may be a public network (e.g., the Internet), a private network (e.g., a local area network (LAN), or wide area network (WAN)), a wireless network, a personal area network (PAN), another network type, and/or a combination thereof. Server 110 may include a desktop computer, a laptop computer, a smartphone, a tablet computer, a server, a wearable device, a virtual reality (VR)/augmented reality (AR)/mixed reality (MR) headset or heads up display, a digital avatar or chat bot kiosk, a device implementing one or more LLMs, an in-vehicle infotainment computing device, and/or any suitable computing device capable of performing the techniques described herein. Server 110 may include large language model 120. Large language model 120 may be any trained machine-learning model capable of performing text completion based on a provided example (e.g., GPT-3, PaLM, Bloom, Megatron GPT, LLAMA, etc.).

In at least one embodiment, large language model 120 may be implemented as a deep learning neural network having multiple levels of linear or non-linear operations. For example, large language model 120 may include convolutional neural layers, recurrent neural layers, fully connected neural networks, neural networks with memory layers/sub-networks, and/or so on. In at least one embodiment, large language model 120 may include multiple neurons, where one or more individual neurons may receive its input from one or more other neurons and/or from an external source, and may produce an output by applying an activation function to the sum of weighted inputs and a bias value. In at least one embodiment, large language model 120 may include multiple neurons arranged in layers, including an input layer, one or more hidden layers, and/or an output layer. In embodiments, neurons from adjacent layers may be connected by weighted edges.

Client device 140 may include a desktop computer, a laptop computer, a smartphone, a tablet computer, a server, a wearable device, a virtual reality (VR)/augmented reality (AR)/mixed reality (MR) headset or heads up display, a digital avatar or chat bot kiosk, an in-vehicle infotainment computing device, and/or any suitable computing device capable of performing the techniques described herein. Client device 140 may be configured to generate LLM input prompts using hierarchical VTG 150. The generated LLM input prompts may be provided to large language model 120 of server 110 (e.g., via network 130).

Hierarchical VTG 150 may be trained based on one or more training datasets 170A-N. Training datasets 170A-N may be stored in dataset repository 160, which may be accessible via network 130. Dataset repository 160 may include a persistent storage capable of storing task-specific training data and/or metadata corresponding to the stored data. Dataset repository 160 may be hosted by one or more storage devices, such as main memory, magnetic or optical storage disks, tapes, or hard drives, network-attached storage (NAS), storage area network (SAN), and so forth. Although depicted as separate from client device 140, in at least some embodiments, dataset repository 160 may be a part of client device 140. In at least some embodiments, dataset repository 160 may be a part of server 110. In at least some embodiments, dataset repository 160 may be a network-attached file server, while in other embodiments dataset repository 160 may be some other type of persistent storage such as an object-oriented database, a relational database, and so forth, that may be hosted by a server machine (e.g., server 110) or one or more different machines coupled to client device 140 and/or server 110 via network 130.

Training datasets 170A-N may include training data and corresponding labels used during training of hierarchical VTG 150. Individual datasets (e.g., training dataset 170A) may include training data of different scopes. For example, a first dataset may include general training data used for a variety of NLP tasks. A second dataset may include training data provided by a group of users. In some embodiments, the training data of the second dataset may be targeted to a specific NLP task. A third dataset may include private data of an individual user. For example, the third dataset may include private medical data and/or financial data (obtained and used with proper consent). In some embodiments, a dataset may include training data, generated by a user, that includes a user-correction of a previous output of an LLM. For example, a LLM may generate an output in response to receiving a virtual token embedding prompt based on an input from the user. If the user decides the generated output is incorrect, the user may modify the LLM output and provide the user input and the modified LLM output to be added to a dataset. Hierarchical VTG 150 may be retrained based on the new data of the dataset and may produce a more accurate or precise output for the specific use case or user if given the same (or similar) user input.

Figure 2:
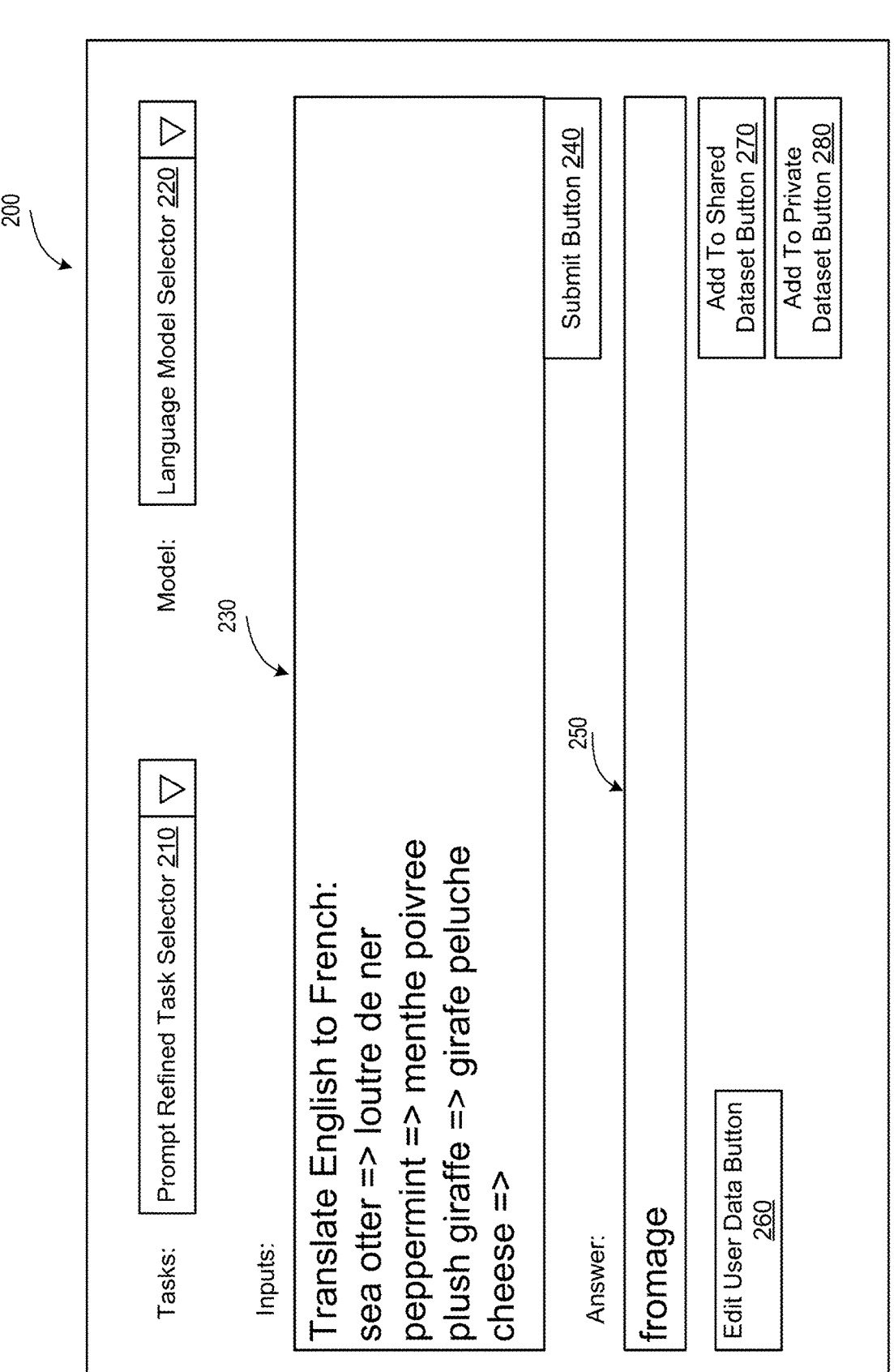
FIG. 2 illustrates an example interface that may permit a user to add training data to a dataset, according to at least one embodiment.

FIG. 2 illustrates an example interface 200 that may permit a user to add training data to a dataset, according to at least one embodiment. Interface 200 may include a prompt refined task selector 210, a language model selector 220, and an input region 230. A user may select, using prompt refined task selector 210, a NLP task to be performed by a LLM. Non-limiting examples of NLP tasks that a user may select may include text generation, summarization, text classification, annotation, translation, sentiment analysis, named entity recognition, and/or relation extraction. A user may also select, using language model selector 220, a language model to perform the selected NLP task. Language models that a user may select may include any trained machine-learning model capable of performing text completion based on a provided example (e.g., GPT-3, PaLM, Bloom, Megatron GPT, LLAMA, etc.). A user may provide, in input region 230, an input corresponding to the selected NLP task. For example, as depicted in FIG. 2, a user may perform a language translation task and may provide one or more example translations as an input. Responsive to the user interacting with (e.g., clicking on) submit button 240, the user input and the selected NLP task may be provided to a hierarchical VTG model (e.g., hierarchical VTG 150 of FIG. 1), which may generate a LLM input prompt. In some embodiments, the user input may be modified based on the selected NLP task before being provided to the LLM. For example, a text corresponding to the selected NLP task may be prepended to the user input.

The LLM input prompt generated by the hierarchical VTG model may include one or more virtual token embeddings. The LLM input prompt may be provided to the selected LLM, which may generate an LLM output. The LLM output may be displayed to the user in output region 250 of interface 200.

If the LLM output is incorrect, the user may modify the LLM output in output region 250. The user may then decide to provide the user input of input region 230 and the modified output of output region 250 as additional training data to a dataset. For example, by clicking on add to shared dataset button 270, the user may add the additional training data to a dataset shared with one or more other users. By clicking on add to private dataset button 280, the user may add the additional training data to a private dataset which only contains data of that user. In some embodiments, additional buttons may be available to allow a user to add the additional data to another dataset. In some embodiments, interface 200 may include a dataset selector to allow a user to select which dataset to add the additional data to. For example, a user may be able to select between one or more shared datasets, such as an organizational dataset, a regional dataset, a national dataset, or the like. Interface 200 may also include edit user data button 260, which may display an additional interface that permits the user to view and/or modify previous data the user has provided to a dataset.

Hierarchical Virtual Token Generator

Figure 3:
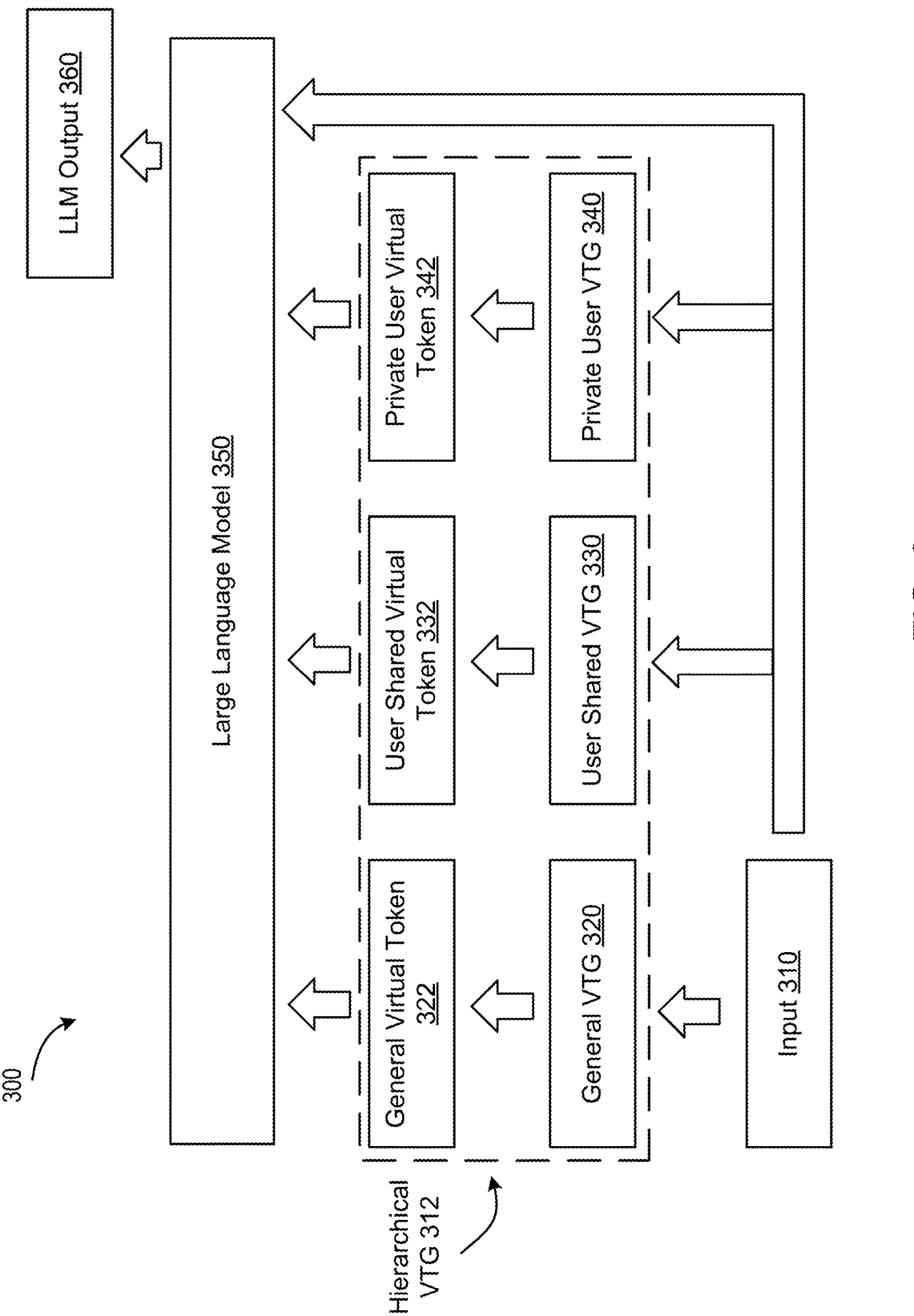
FIG. 3 illustrates an example data flow during generation of a language model output based on input virtual token embeddings, according to at least one embodiment.

FIG. 3 illustrates an example data flow 300 during generation of a language model output based on input virtual token embeddings, according to at least one embodiment. An input 310 may be received and may be provided to hierarchical VTG 312. Hierarchical VTG 312 may include one or more trained VTGs, such as general VTG 320, user shared VTG 330, and private user VTG 340. General VTG 320 may generate general virtual token 322 based on input 310. User shared VTG 330 may generate user shared virtual token 332 based on input 310. Private user VTG 340 may generate private user virtual token 342 based on input 310. In some embodiments, general virtual token 322, user shared virtual token 332, and private user virtual token 342 each include a virtual token embedding of a fixed length. The fixed length of a virtual token embedding for each of the different tokens 322, 332, and 342 may differ, or be the same. As one example, the fixed length of the general virtual token 322 may be different (e.g., larger, smaller) than the fixed length of a virtual token embedding of private user virtual token 342, and similarly for the user shared virtual token 332.

General virtual token 322, user shared virtual token 332, private user virtual token 342, and input 310 may be provided to large language model 350. Large language model 350 may generate LLM output 360, which may contain the result of the NLP task requested by the user.

Figure 4A:
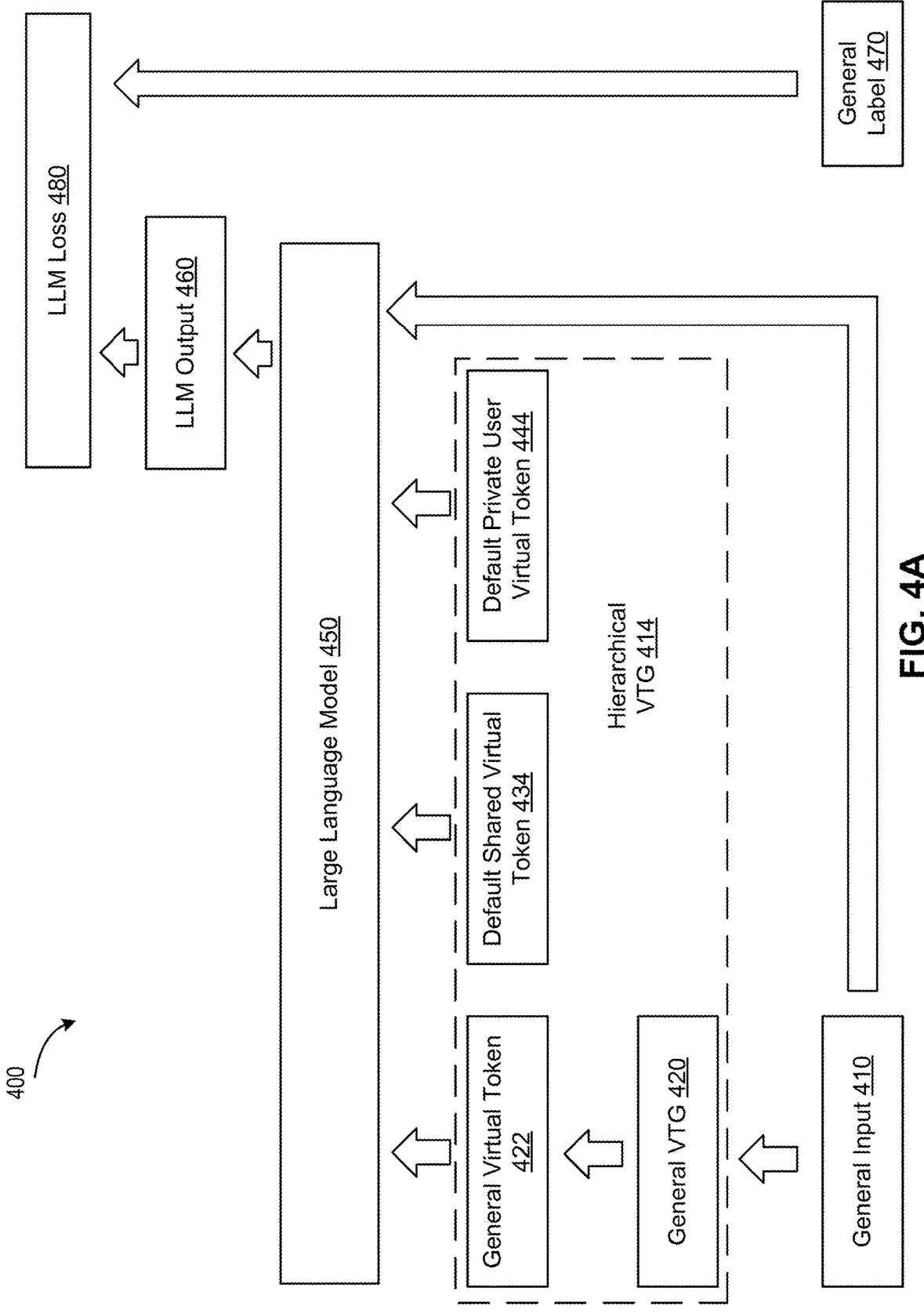
FIGS. 4A-B illustrate example data flows during training of a hierarchical virtual token generator model, according to at least one embodiment.
Figure 4B:
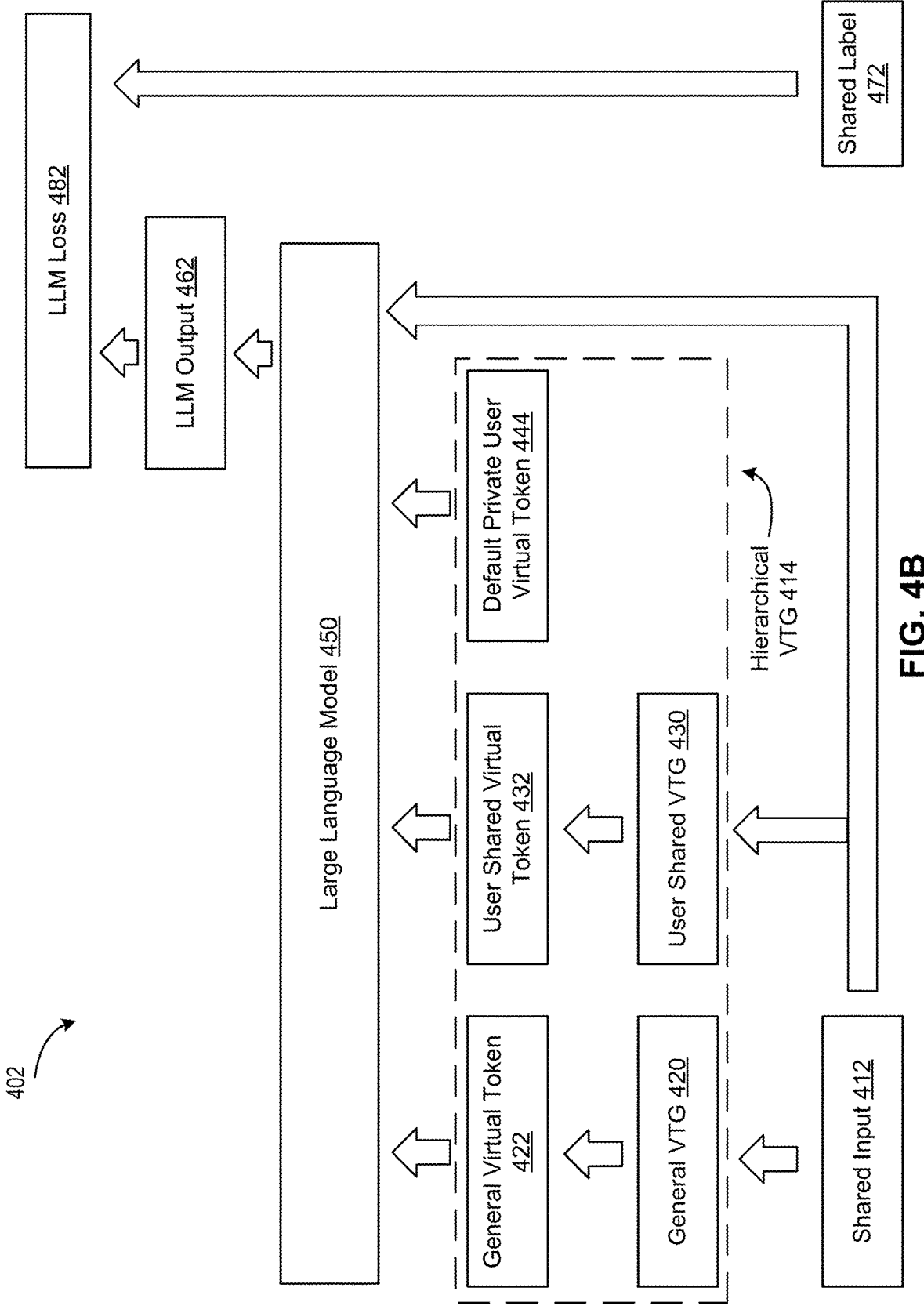

FIGS. 4A-B illustrate example data flows 400 and 402 during training of a hierarchical VTG model, according to at least one embodiment. Individual VTGs of hierarchical VTG 414 may be trained individually. For example, referring to FIG. 4A, during a first training phase, general VTG 420 may receive general input 410. General input 410 may be a user input of a plurality of user inputs of a first dataset. General label 470 may be the target LLM output of the first dataset corresponding to general input 410. General VTG 420 may generate general virtual token 422 based on general input 410 and based on neural network weights of general VTG 420. During the first training phase, default virtual token embeddings may be used in place of outputs generated by a VTG. Default virtual token embeddings may have a same fixed length as the corresponding virtual token embedding generated by the corresponding VTG. The values of a default virtual token embedding may be generated based on a random distribution of the embedding space.

General virtual token 422, default shared virtual token 434, default private user virtual token 444, and general input 410 may be combined to create an LLM input prompt that is provided to LLM 450. LLM 450 may generate LLM output 460 in response to the received input prompt. LLM output 460 may be compared to general label 470 based on a loss function to determine LLM loss 480. In some embodiments, the loss function is a cross-entropy loss function. During the first training phase, weights of general VTG 420 may be updated to minimize LLM loss 480. This process may be repeated for additional inputs and labels of the first dataset. The first training phase may end when LLM loss 480 is below a predetermined threshold.

Referring now to FIG. 4B, during a second training phase, general VTG 420 and user shared VTG 430 of hierarchical VTG 414 may receive shared input 412. Shared input 412 may be a user input of a plurality of user inputs of a second dataset. Shared label 472 may be the target LLM output of the second dataset corresponding to shared input 412. General VTG 420 may generate general virtual token 422 based on shared input 412 and based on the neural network weights trained during the first training phase. User shared VTG 430 may generate user shared virtual token 432 based on shared input 412 and neural network weights of user shared VTG 430.

General virtual token 422, user shared virtual token 432, default private user virtual token 444, and shared input 412 may be combined to create an LLM input prompt that is provided to LLM 450. LLM 450 may generate LLM output 462 in response to the received input prompt. LLM output 462 may be compared to shared label 472 based on a loss function to determine LLM loss 482. During the second training phase, weights of user shared VTG 430 may be updated to minimize LLM loss 482, while weights of general VTG 420 are frozen and are not modified. This process may be repeated for additional inputs and labels of the second dataset. The second training phase may end when LLM loss 482 is below a predetermined threshold. Because general VTG 420 was trained to have a minimal loss during the first training phase, training user shared VTG 430 during the second training phase may require much less time than the training general VTG 420 during the first training phase.

During a third training phase (not shown), a third VTG (e.g., private user VTG 340) of hierarchical VTG 414 may be trained using inputs and labels of a third dataset. During the third training phase, neural network weights of the third VTG may be updated to minimize a LLM loss while weights of other VTGs (e.g., general VTG 420, user shared VTG 430, etc.) are frozen. Because other VTGs were trained during the first and second training phases, training the third VTG during the third training phase may require much less time than the time required during the first and/or second training phase.

Because the time required to train successive VTGs of the hierarchical VTG model is reduced, individual VTGs of the hierarchical VTG model may be retrained at different intervals. For example, the first VTG of a hierarchical VTG (e.g., general VTG 320) may require the most amount of time to train. In some embodiments, the first VTG may be trained once. In some embodiments, the first VTG may be retrained at a first interval (e.g., monthly). A second VTG of the hierarchical VTG (e.g., user shared VTG 330) may be retrained at a second interval that is shorter than the first interval (e.g., weekly, daily). A third VTG of the hierarchical VTG (e.g., private user VTG 340) may be retrained at a third interval that is shorter than the first interval (e.g., hourly). In some embodiments, a third VTG of the hierarchical VTG may be retrained immediately after a user adds additional training data to the dataset corresponding to the third VTG.

In some embodiments, data of a particular dataset may be moved to another dataset. For example, training data of a second dataset may be moved to a first dataset after a predetermined duration of time (e.g., 6 months) or after the amount of data of the second dataset exceeds a predetermined threshold.

After the hierarchical VTG model has been trained, it may be used for a variety of application. For example, the trained hierarchical VTG model may be used to improve the performance of a LLM that performs financial analysis to aid business owners in measuring business health and progress toward reaching company goals. The financial analysis workflow may include NLP tasks such as named entity recognition, classification, and/or customized text generation. Given the company's income statement and balance sheet document, a LLM may be expected to extract the useful named entities, like different assets, liabilities, revenue, income, etc., and derive some performance metrics as supplementary information. The LLM may also be expected classify, based on the financial documents, the type of business the documents belong to. The LLM may further be expected to combine the numbers and the business categories to generate a financial health report using the text generation capability of the LLM.

A user may provide, for a given task, an input to the hierarchical VTG, which will generate an LLM input prompt that will be provided to the LLM, which will generate an LLM output. For example, to extract the income number for a certain financial document, the user can formulate an input like "document: {document}, the XXX company income:", where "{document}" is a placeholder for the financial document. If the output of the LLM is incorrect and does not provide the correct company income based on the provided document, the user may correct the output and add the input and the corrected output to a dataset in order to improve the accuracy of the hierarchical VTG for that task. After a few rounds of interaction, the service may be able to perform the task as expected. In this way, the hierarchical VTG model provides the capability of human-in-the-loop—or model alignment—to customize the financial document analysis.

In some embodiments, the hierarchical VTG model may be used for personalized automatic speech recognition (ASR). In this task, there are general user-independent vocabulary, with its language model distribution, and user-specific vocabulary that can have quite similar pronunciations yet different spellings. By providing corrected output data to the hierarchical VTG, each user's personalized vocabulary can be recognized and updated. In addition, model distilling can be further applied to finetune the general large-scale language to improve the quality of the final ASR accuracies.

Figure 5:
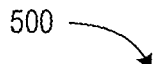
FIG. 5 is a flow diagram of an example method of training a hierarchical virtual token generator model, according to at least one embodiment.
Figure 5:
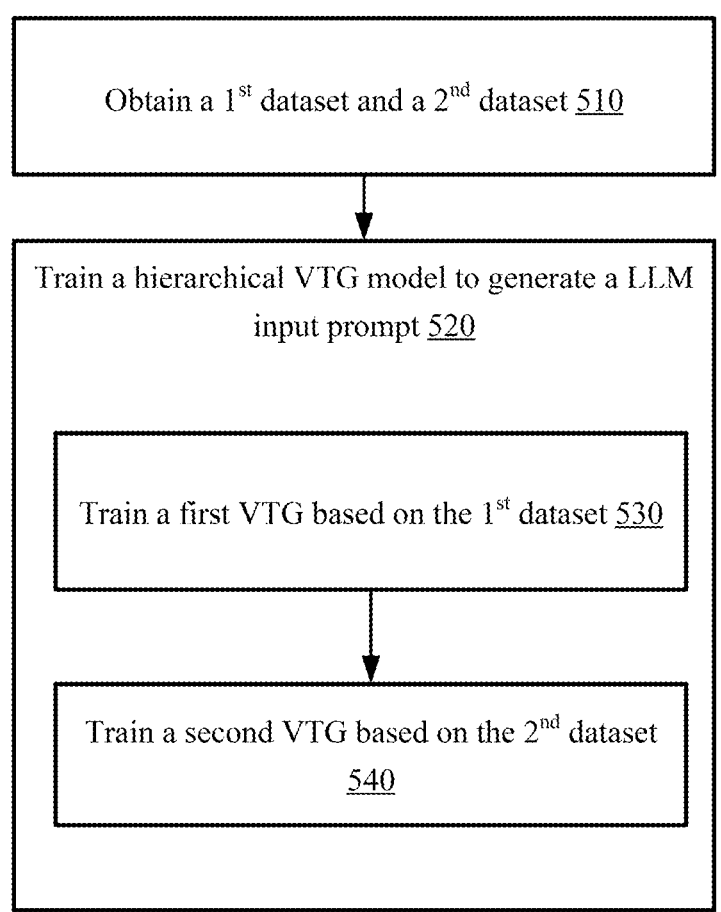
Figure 6:
FIG. 6 is a flow diagram of an example method of performing a natural-language processing task using a language model prompt generated using a hierarchical virtual token generator model, according to at least one embodiment.
Figure 6:
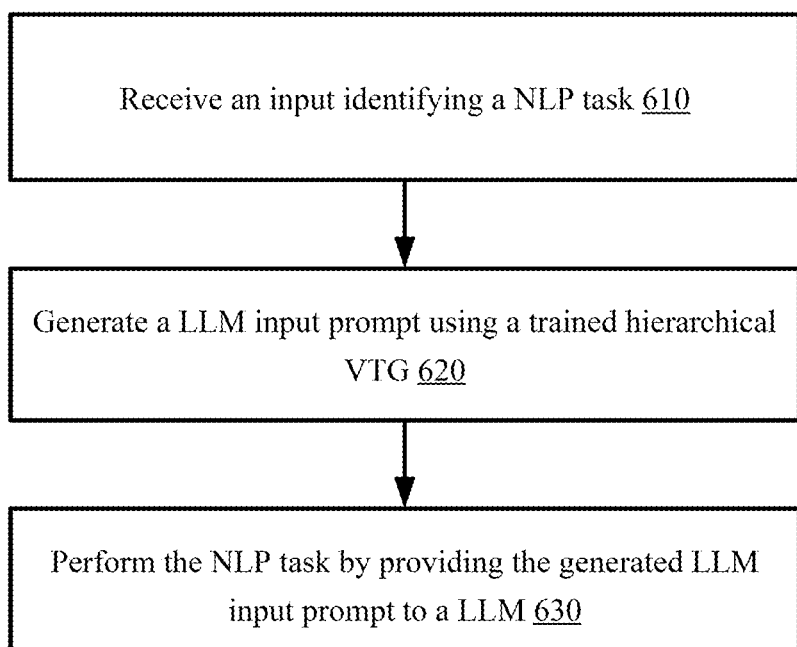

FIG. 5 is a flow diagram of an example method 500 of training a hierarchical VTG model, according to at least one embodiment. FIG. 6 is a flow diagram of an example method 600 of performing a natural-language processing task using a language model prompt generated using a hierarchical virtual token generator model, according to at least one embodiment. Methods 500 and 600 may be performed using one or more processing units (e.g., CPUs, GPUs, accelerators, PPUs, DPUs, etc.), which may include (or communicate with) one or more memory devices. In at least one embodiment, methods 500 and 600 may be performed using processing units of server 110 and/or client device 140. In at least one embodiment, processing units performing any of methods 500 and/or 600 may be executing instructions stored on a non-transient computer-readable storage media. In at least one embodiment, any of methods 500 and/or 600 may be performed using multiple processing threads (e.g., CPU threads and/or GPU threads), individual threads executing one or more individual functions, routines, subroutines, or operations of the method. In at least one embodiment, processing threads implementing any of methods 500 and/or 600 may be synchronized (e.g., using semaphores, critical sections, and/or other thread synchronization mechanisms). Alternatively, processing threads implementing any of methods 500 and/or 600 may be executed asynchronously with respect to each other. Various operations of any of methods 500 and/or 600 may be performed in a different order compared with the order shown in FIG. 5 and/or FIG. 6. Some operations of any of methods 500 and/or 600 may be performed concurrently with other operations. In at least one embodiment, one or more operations shown in FIG. 5 and/or FIG. 6 may not always be performed.

FIG. 5 is a flow diagram of an example method 500 of training a hierarchical VTG model, according to at least one embodiment. At block 510, processing units executing method 500 may obtain a first dataset and a second dataset. In some embodiments, the first dataset may correspond to a general dataset for training a model to perform NLP tasks and the second dataset may correspond to a set of user provided—or more generally, curated—training data. At block 520, processing units executing method 500 may train a hierarchical VTG model to generate a LLM input prompt. To train the hierarchical VTG mode, processing units may, at block 530, train a first VTG based on the first dataset. Training the first VTG may include, as described above, generating, by the first VTG, a virtual token embedding based on a received user input of the first dataset. The generated virtual token embedding may be included in a LLM input prompt to be provided to a LLM. In some embodiments, additional virtual token embeddings and/or the user input may be included in the LLM input prompt. The LLM may generate an output in response to the LLM input prompt. A LLM loss may be calculated based on a difference between the LLM output and a target output of the first dataset corresponding to the user input. Weights (e.g., neural network weights, attention weights, etc.) of the first VTG may be updated to minimize the LMM loss.

To further train the hierarchical VTG model, processing units may also, at block 540, train a second VTG based on the second dataset. Training the second VTG may include, as described above, generating, by the first VTG and the second VTG, virtual token embeddings based on a received user input of the second dataset. The virtual token embeddings may be included in a second LLM input prompt, which may include additional virtual token embeddings (e.g., default virtual token embeddings) and/or the user input. The LLM may generate a second output in response to the second LLM input prompt. A second LLM loss may be calculated based on a difference between the second LLM output and a target output of the second dataset corresponding to the user input. Weights of the second VTG may be updated to minimize the LLM loss while keeping the weights of the first VTG frozen.

FIG. 6 is a flow diagram of an example method 600 of performing a natural-language processing task using a language model prompt generated using a hierarchical virtual token generator model, according to at least one embodiment. At block 610, processing units executing method 600 may receive an input identifying an NLP task. The NLP task may include text generation, summarization, text classification, annotation, translation, and/or sentiment analysis. At block 620, processing units may generate a LLM input prompt using a trained hierarchical VTG. The hierarchical VTG may be trained as discussed above. The generated LLM input prompt may include one or more virtual token embeddings and/or a user input. At block 630, processing units may perform the NLP task by providing the generated LLM input prompt to an LLM.

The systems and methods described herein may be used for a variety of purposes, by way of example and without limitation, for performing one or more operations with respect to systems or methods associated with machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, chat bots, digital avatars, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an in-vehicle infotainment system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for generating or presenting virtual reality content, mixed reality content, or augmented reality content, systems for performing conversational AI operations, systems implementing one or more language models-such as large language models (LLMs), systems for performing light transport simulation, systems for performing collaborative content creation for 3D assets, systems implemented at least partially using cloud computing resources, and/or other types of systems.

Inference and Training Logic

Figure 7A:
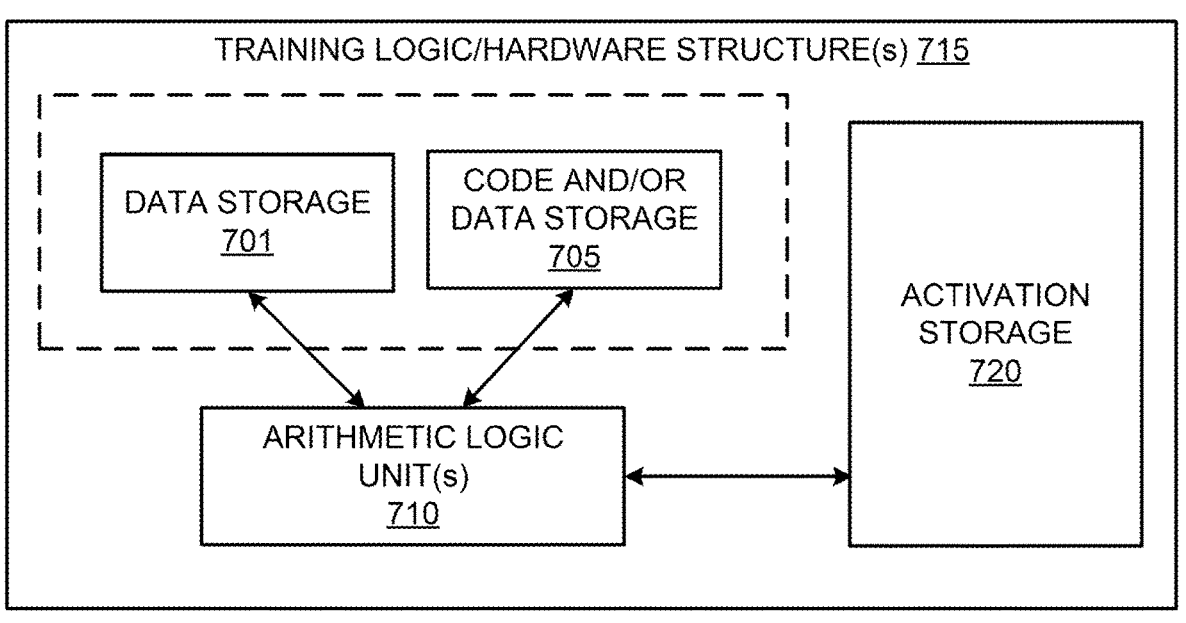
FIG. 7A illustrates inference and/or training logic, according to at least one embodiment of the present disclosure.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include (or be coupled to code and/or data storage 701 that stores) graph code or other software to control timing and/or order, in which weight and/or other parameter information is to be loaded to configure processing units, including logic units, integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include (or be coupled to code and/or data storage 705 that stores) graph code or other software to control timing and/or order, in which weight and/or other parameter information is to be loaded to configure processing units, including logic units, integer and/or floating point units (collectively, arithmetic logic units (ALUs)).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within the same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
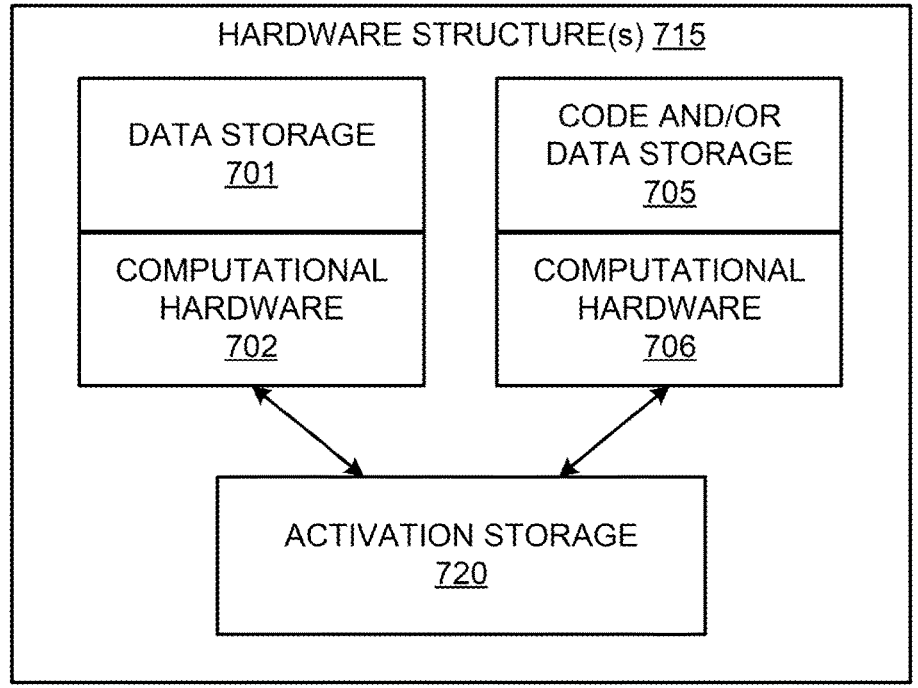
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, the result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training And Deployment

Figure 8:
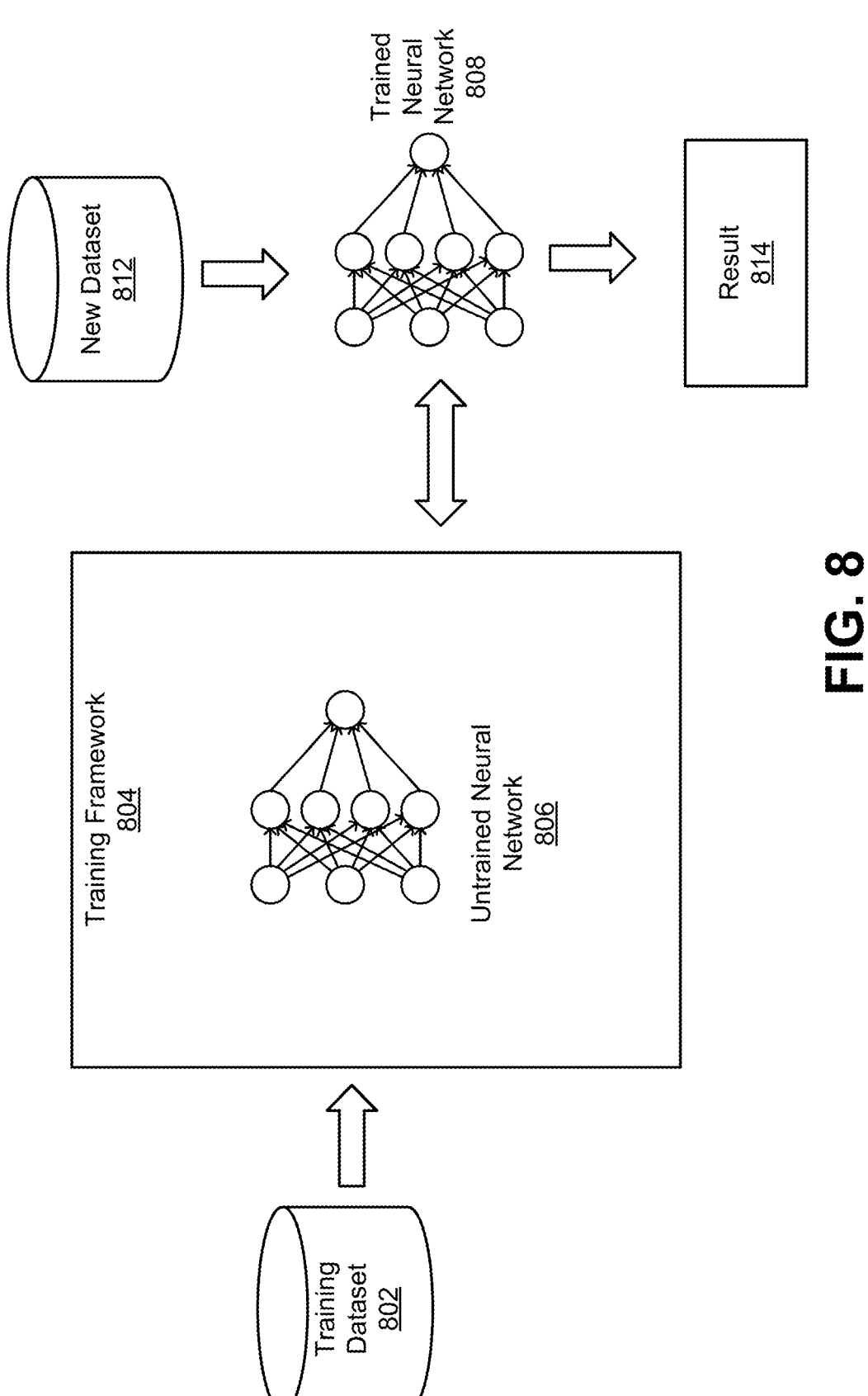
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a Tensor-Flow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjusting weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, wherein untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
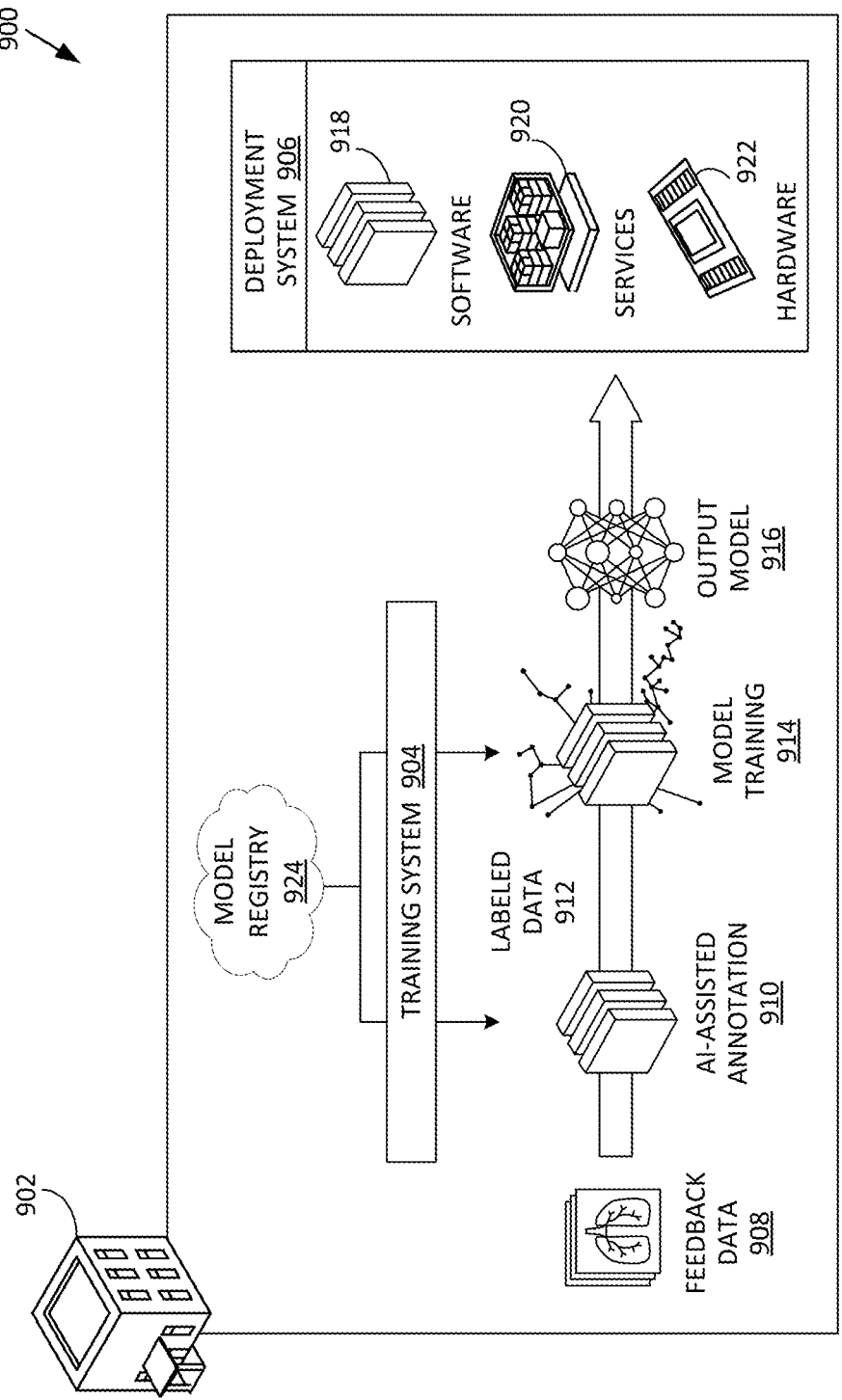
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some applications used in advanced processing and inferencing pipelines may use machine learning models or other AI to perform one or more processing steps. In at least one embodiment, machine learning models may be trained at facility 902 using feedback data 908 (such as imaging data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model, e.g., via model training 914 in FIGS. 9-10. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities that are remotely located). In at least one embodiment, machine learning models may have been trained on imaging data from one location, two locations, or any number of locations. In at least one embodiment, when being trained on imaging data, which may be a form of feedback data 908, from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914 may include data—e.g., AI-assisted annotations 910, labeled data 912, or a combination thereof—that may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo preprocessing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in one or more container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
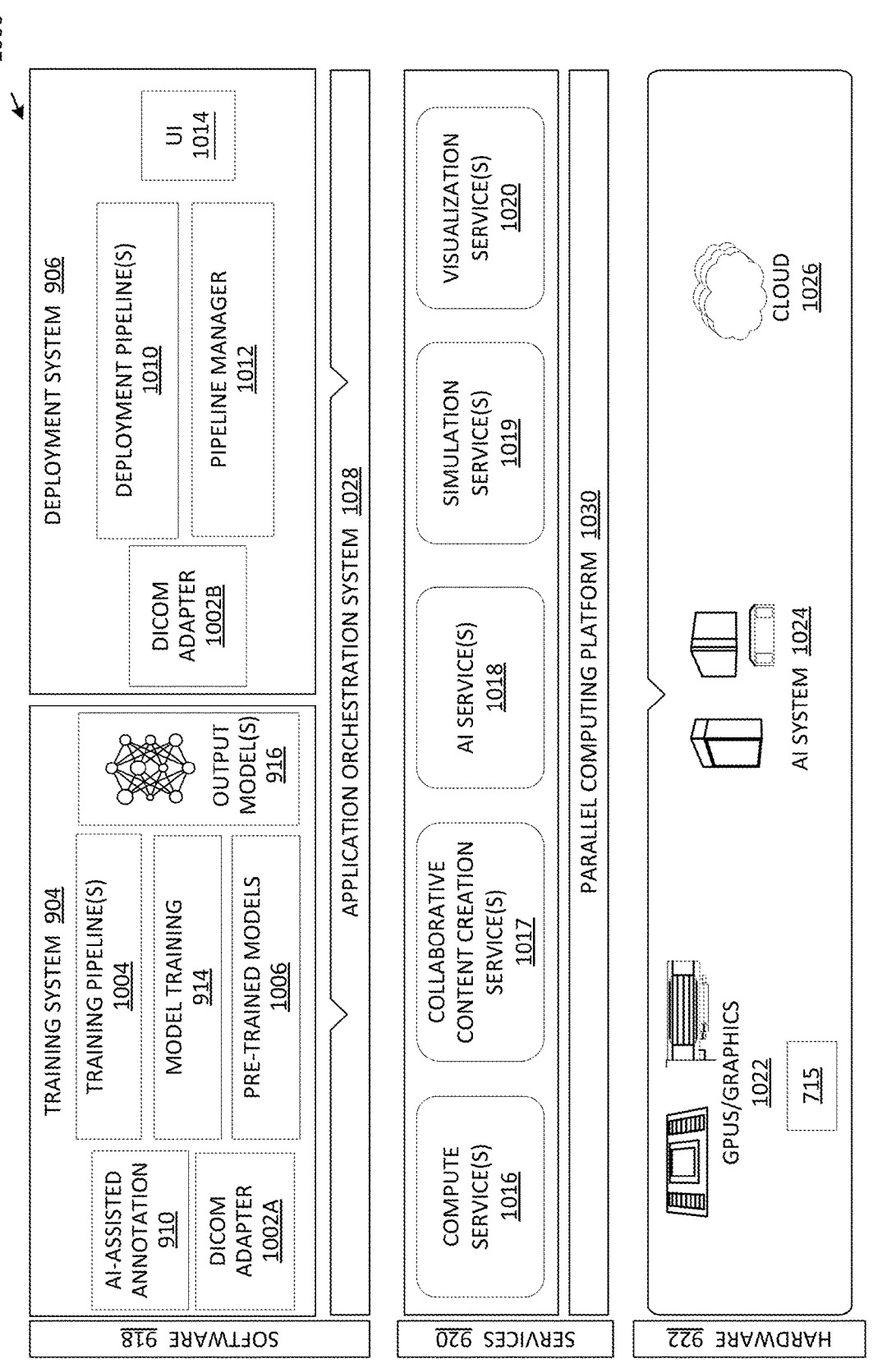
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity that provides an inference or image processing request may browse a container registry and/or model registry 924 for an application, container, dataset, machine learning model, etc., select a desired combination of elements for inclusion in data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of a data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, collaborative content creation services, simulation services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel, e.g., using a parallel computing platform 1030 (FIG. 10). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more processing operations associated with segmentation tasks. In at least one embodiment, software 918 implementing advanced processing and inferencing pipeline may be streamlined because each application may call upon the same inference service to perform one or more inferencing tasks.

In at least one embodiment, hardware 922 may include GPUs, CPUs, graphics cards, an AI/deep learning system (e.g., an AI supercomputer, such as NVIDIA's DGX™ supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, simulation, and visual computing, as non-limiting examples. In at least one embodiment, at least some of the computing environment of deployment system 906 and/or training system 904 may be executed in a datacenter or one or more supercomputers or high performance computing systems, with GPU-optimized software (e.g., hardware and software combination of NVIDIA's DGX™ system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC™) may be executed using an AI/deep learning supercomputer(s) and/or GPU-optimized software (e.g., as provided on NVIDIA's DGX™ systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 906) may implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public internet service providers (ISPs) that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (e.g., Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004, similar to a first example described with respect to FIG. 9, may be used for a first machine learning model, training pipeline 1004, similar to a second example described with respect to FIG. 9, may be used for a second machine learning model, and training pipeline 1004, similar to a third example described with respect to FIG. 9, may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904 and may be implemented by deployment system 906.

In at least one embodiment, output model(s) 916 and/or pre-trained model(s) 1006 may include any types of machine learning models depending on embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of, AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 902. In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types), including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface (UI) 1014 (e.g., a graphical user interface, a web interface, etc.) that may be used to select applications for inclusion in deployment pipeline(s) 1010, arrange applications, modify or change applications or parameters or constructs thereof, use and interact with deployment pipeline(s) 1010 during set-up and/or deployment, and/or to otherwise interact with deployment system 906. In at least one embodiment, although not illustrated with respect to training system 904, UI 1014 (or a different user interface) may be used for selecting models for use in deployment system 906, for selecting models for training, or retraining, in training system 904, and/or for otherwise interacting with training system 904.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of the applications or containers. In at least one embodiment, because one or more of applications or containers in deployment pipeline(s) 1010 may share the same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of requirements and availability of a system. In some examples, the scheduler (and/or other component of application orchestration system 1028) may determine resource availability and distribution based on constraints imposed on a system (e.g., user constraints), such as quality of service (QOS), urgency of need for data outputs (e.g., to determine whether to execute real-time processing or delayed processing), etc.

In at least one embodiment, services 920 leveraged and shared by applications or containers in deployment system 906 may include compute services 1016, collaborative content creation services 1017, AI services 1018, simulation services 1019, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA®) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in the same location of a memory may be used for any number of processing tasks (e.g., at the same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure an appropriate machine learning model is loaded into a cache (e.g., shared storage), and/or a copy of a model may be saved to a cache. In at least one embodiment, the scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel-level segmentation, voxel-level segmentation, generating a visualization, or generating text to summarize findings. In at least one embodiment, different models or applications may be assigned different priorities. For example, some models may have a real-time (turn-around time less than one minute) priority while others may have lower priority (e.g., turnaround less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provided through a queue. In at least one embodiment, a request is placed in a queue via an API for an individual application/tenant ID combination and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing or other light transport simulation techniques, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA® and/or QUADRO® GPUs) may include any number of GPUs that may be used for executing processing tasks of compute services 1016, collaborative content creation services 1017, AI services 1018, simulation services 1019, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX™) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC™) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may be tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TensorRT™), provide an accelerated parallel computing API and platform 1030 (e.g., NVIDIA's CUDA®), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry, such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two but can be more when so indicated either explicitly or by context. Further, unless stated otherwise or otherwise clear from context, the phrase "based on" means "based at least in part on" or "based at least on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, in some embodiments, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   training a hierarchical virtual token generator (VTG) model to generate a large language model (LLM) input prompt, the training comprising:
      training, based at least on a first dataset, a first VTG to output a first virtual token embedding; and
      training, based at least on a second dataset different from the first dataset, a second VTG to output a second virtual token embedding;
   wherein, during the training of the hierarchical VTG model, the LLM input prompt comprises the first virtual token embedding and the second virtual token embedding.

2. The method of claim 1, further comprising:
   obtaining a third dataset;
   wherein training the hierarchical VTG model further comprises:
      training, based at least on a third dataset, a third VTG to output a third virtual token embedding; and
      wherein the LLM input prompt further comprises the third virtual token embedding.

3. The method of claim 1, wherein the first dataset comprises a first training input and a first target output, and wherein the training the first VTG based at least on the first dataset comprises:
   generating, using the first VTG, the first virtual token embedding based at least on the first training input of the first dataset;
   generating, using the LLM, a first LLM output based at least on a first LLM input, the first LLM input comprising the first virtual token embedding;
   calculating a first LLM loss based at least on a difference between the first LLM output and the first target output of the first dataset; and
   modifying one or more first weights of the first VTG based at least on the calculated first LLM loss.

4. The method of claim 3, wherein the second dataset comprises a second training input and a second target output, and wherein the training the second VTG based at least on the second dataset comprises:
   generating, using the first VTG, a third virtual token embedding based at least on the second training input of the second dataset;
   generating, using the second VTG, the second virtual token embedding based at least on the second training input of the second dataset;
   generating, using the LLM, a second LLM output based at least on a second LLM input, the second LLM input comprising the second virtual token embedding and the third virtual token embedding;
   calculating a second LLM loss based at least on a difference between the second LLM output and the second target output of the second dataset; and
   modifying one or more second weights of the second VTG based at least on the calculated second LLM loss.

5. The method of claim 1, wherein the second dataset comprises:
   a second training input provided by a user, and
   a second target output corresponding to the second training input, wherein the second target output comprises a user-provided correction of an output of the LLM generated in response to receiving as input a prompt generated using the hierarchical VTG model.

6. The method of claim 1, further comprising:
   retraining the second VTG responsive to data being added to the second dataset.

7. The method of claim 1, wherein the second dataset comprises private data provided by a user, the private data being related to a natural-language processing (NLP) task.

8. The method of claim 1, wherein the first VTG uses a perceiver transformer architecture, and wherein the first virtual token embedding is of a fixed length.

9. A method comprising:
   generating a large language model (LLM) input prompt using a hierarchical virtual token generator (VTG) model, wherein the hierarchical VTG model comprises:
      a first VTG to generate a first virtual token embedding, and
      a second VTG to generate a second virtual token embedding; and performing a natural language processing (NLP) task based at least on providing the LLM input prompt as input to an LLM, the LLM input prompt including the first virtual token embedding and the second virtual token embedding.

10. The method of claim 9, wherein the hierarchical VTG model further comprises a third VTG to generate a third virtual token embedding, and wherein the LLM input prompt further comprises the third virtual token embedding.

11. The method of claim 10, wherein the third VTG is trained based on private data provided by a user, the private data being related to the NLP task.

12. The method of claim 11, wherein the private data provided by the user comprises at least one of:
    financial data; or
    medical data.

13. The method of claim 9, wherein the NLP task comprises at least one of:
    text generation;
    summarization;
    text classification;
    annotation;
    translation;
    sentiment analysis;
    named entity recognition; or
    relation extraction.

14. The method of claim 9, wherein the first VTG uses a perceiver transformer architecture, and wherein the first virtual token embedding is of a fixed length.

15. A system comprising:
    one or more processors to:
        generate a large language model (LLM) input prompt using a hierarchical virtual token generator (VTG) model, the hierarchical VTG model comprising:
            a first VTG to generate a first virtual token embedding, and
            a second VTG to generate a second virtual token embedding; and
        perform a natural language processing (NLP) task based at least on an LLM processing the LLM input prompt including the first virtual token embedding and the second virtual token embedding.

16. The system of claim 15, wherein the hierarchical VTG model further comprises a third VTG trained to generate a third virtual token embedding, and wherein the LLM input prompt further comprises the third virtual token embedding.

17. The system of claim 16, wherein the third VTG is trained based on private data provided by a user, the private data being related to the NLP task.

18. The system of claim 17, wherein the private data provided by the user comprises at least one of:
    financial data; or
    medical data.

19. The system of claim 15, wherein the NLP task comprises at least one of:
    text generation;
    summarization;
    text classification;
    annotation;
    translation;
    sentiment analysis;
    named entity recognition; or
    relation extraction.

20. The system of claim 15, wherein the system is comprised in at least one of:
    a control system for an autonomous or semi-autonomous machine;
    a perception system for an autonomous or semi-autonomous machine;
    a system for performing simulation operations;
    a system for performing digital twin operations;
    a system for performing light transport simulation;
    a system for performing collaborative content creation for 3D assets;
    a system for performing deep learning operations;
    a system implemented using an edge device;
    a system for generating or presenting at least one of augmented reality content, virtual reality content, or mixed reality content;
    a system implemented using a robot;
    a system for performing conversational AI operations;
    a system for generating synthetic data;
    a system incorporating one or more virtual machines (VMs);
    a system implemented at least partially in a data center; or
    a system implemented at least partially using cloud computing resources.

* * * * *